United States Patent [19]
Born

[11] Patent Number: 6,108,812
[45] Date of Patent: *Aug. 22, 2000

[54] TARGET DEVICE XOR ENGINE

[75] Inventor: Richard M. Born, Fort Collins, Colo.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/667,204

[22] Filed: Jun. 20, 1996

[51] Int. Cl.$^7$ .............................. G06F 11/10; H03M 13/00
[52] U.S. Cl. ............................................. 714/807; 714/702
[58] Field of Search ....................................... 395/800, 275, 395/575, 182.2, 182.03, 182.04; 714/770, 755, 763, 787, 756, 764, 716, 752, 758, 807, 701, 702

[56] References Cited

U.S. PATENT DOCUMENTS

| | | | |
|---|---|---|---|
| 4,188,616 | 2/1980 | Kazami et al. | 340/146.1 |
| 4,527,269 | 7/1985 | Wood et al. | 714/703 |
| 5,103,451 | 4/1992 | Fossey | 714/757 |
| 5,157,669 | 10/1992 | Yu et al. | 714/758 |
| 5,241,546 | 8/1993 | Peterson et al. | 714/761 |
| 5,251,215 | 10/1993 | Dravida et al. | 370/471 |
| 5,257,391 | 10/1993 | DuLac et al. | 395/800 |
| 5,274,799 | 12/1993 | Brant et al. | 714/6 |
| 5,287,462 | 2/1994 | Jibbe et al. | 710/36 |
| 5,301,297 | 4/1994 | Menon et al. | 711/114 |
| 5,375,127 | 12/1994 | Leak et al. | 714/772 |
| 5,383,204 | 1/1995 | Gibbs et al. | 714/758 |
| 5,404,454 | 4/1995 | Parks | 710/21 |
| 5,410,546 | 4/1995 | Boyer et al. | 371/37.1 |
| 5,426,654 | 6/1995 | Hayashi et al. | 714/781 |
| 5,446,691 | 8/1995 | North et al. | 365/189.02 |
| 5,499,253 | 3/1996 | Lary | 371/40.1 |
| 5,574,736 | 11/1996 | Bandy | 378/17 |

FOREIGN PATENT DOCUMENTS

| | | | |
|---|---|---|---|
| 0503417 | 9/1992 | European Pat. Off. | G06F 11/10 |
| 0662660 | 7/1995 | European Pat. Off. | G06F 11/10 |

*Primary Examiner*—Albert De Cady
*Assistant Examiner*—McDieunel Marc

[57] ABSTRACT

A distributed XOR device that preferably includes a data buffer. The data buffer preferably stores at least two data blocks in an interleaved manner. The data blocks contain data words, and a specific data word for each data block contains CRC bits. In response to certain addresses, the data words of the data blocks are output from the data buffer in an interleaved manner. An XOR engine circuit receives the interleaved data words. The XOR engine circuit preferably includes a data XOR circuit and an error detection circuit. The data XOR circuit preferably performs an exclusive-OR function on pairs of data words, where one data word is from a one data block and the other data word in from the other data block. The generated combinations or results are output to the error detection circuit. The error detection circuit generates CRC bits from the generated combinations or results. Preferably, the CRC bits are encoded with a constant $ID_{CRC}$. These encoded CRC bits are compared to the result of the exclusive-OR function on the CRC bits of the data blocks. If these bits are not equal, an error signal is output. The comparison therefore checks whether the XOR engine circuit or the data blocks are in error.

18 Claims, 3 Drawing Sheets

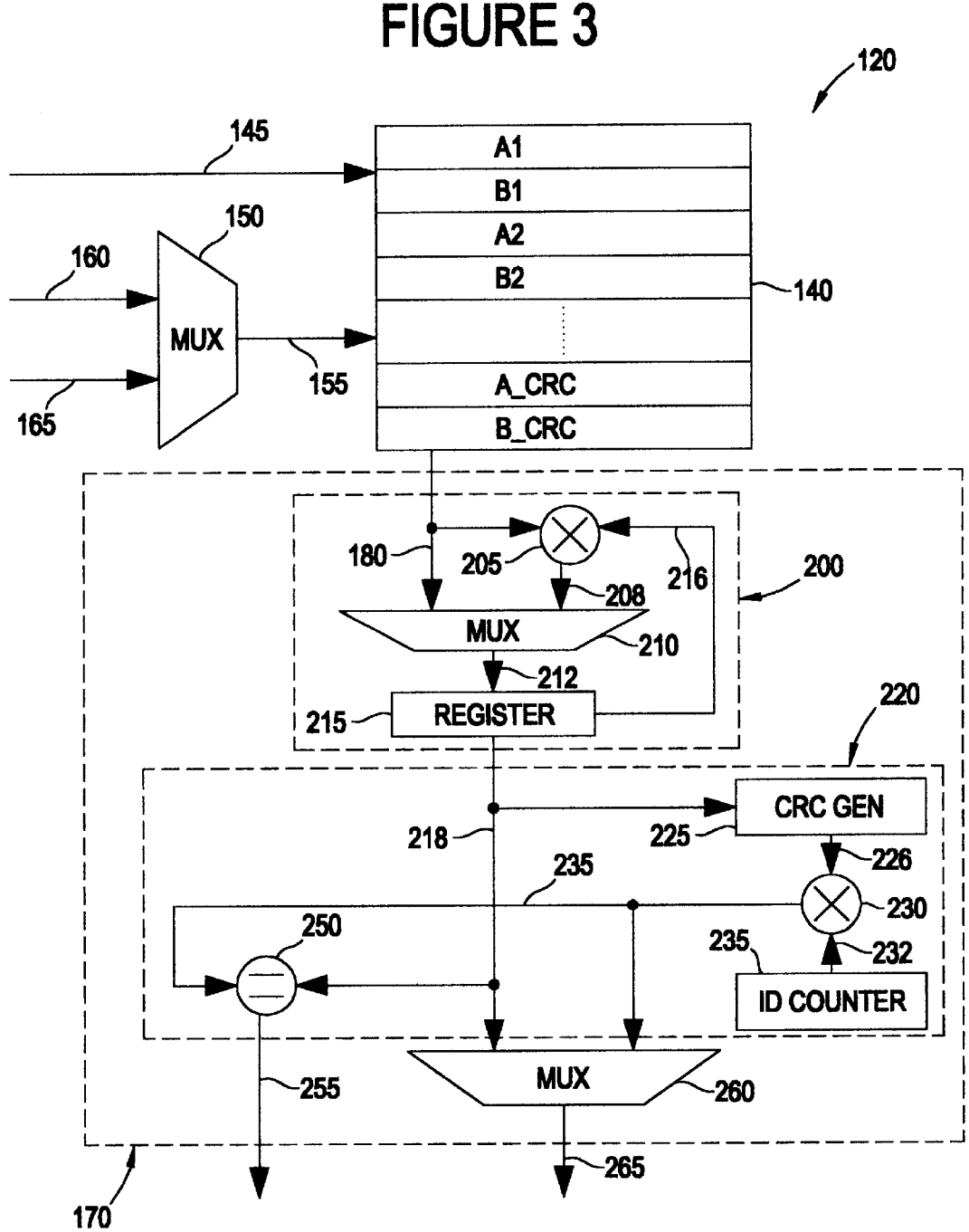

TARGET DEVICE XOR ENGINE

FIELD OF THE INVENTION

The present invention relates to redundant arrays of inexpensive disks and in particular to a distributed exclusive-OR function for target devices to perform a read-modify-write operation.

BACKGROUND OF THE INVENTION

The integrity of data stored in storage systems is typically protected by error detection code methods. One such method is the Reed-Solomon Cyclic Redundancy Check (R-S CRC). This method generates a code word for each data block stored in the storage system. The first k bits of an n bit code word represent the data block and the last n-k bits are the CRC bits. The CRC bits are created from a modulo-2 function of the data block k bits and a generator polynomial.

When the data is retrieved from the storage system, the data is checked for any errors. The check can be performed by executing the modulo-2 function of the data block k bits and the generator polynomial again. The resulting CRC bits are then compared to the previous CRC bits. If they are not equal, an error in either the data or its transmission occurred. Appropriate error correction techniques are then implemented.

Redundant arrays of inexpensive disks (RAID) are an example of a data storage system. RAIDs include the capability of correcting or recreating erroneous data and for remedying a complete failure of a disk in an array. Of the five RAID architectures 1–5, RAID 5 is presently the most popular since it provides high data reliability with a low overhead cost for redundancy, good data read performance and satisfactory data write performance.

RAID 5 utilizes a known error detection concept based on an exclusive-OR function and distributes the calculated parity bits, as well as the data, among all the disks in the array. The error detection is performed by an array controller, which also oversees other operations of the disk arrays. The array controller typically incorporates multiple small computer system interface (SCSI) buses.

The array controller provides and receives data from the disks of the array through associated disk controllers. Each of these disk controllers can have a high bandwidth, such as 160 Mbytes/s. However, the bandwidth between the disk medium and the disk controller can be much less, such as 20 Mbytes/s. As a result, the disk controller has a considerable amount of bandwidth remaining that can be employed for other functions.

Transferring the error detection operation from the array controller to each disk controller has been proposed to take advantage of the remaining disk controller bandwidth. This operation transfer allows the use of a standard SCSI controller as an array controller for the RAID 5 architecture. The transfer would also reduce the amount of hardware in the array controller required to support the RAID 5 architecture and would free up bandwidth of the array controller. Moreover, the total overhead of the error detection operation for each disk controller would be less than the overhead for that operation in the array controller.

To transfer the error detection operation from the array controller to each disk controller, a Read-Modify-Write operation must be supported by each disk controller. The Read-Modify-Write operation is used any time a write operation needs to be performed on the array, such as the writing of data from a host.

There are two architectures that an array controller must support: a multiple interface striping configuration and single interface striping configuration. Briefly, striping is storing of data constituents, anywhere from a bit to a disk sector, onto separate disk drives of the array at related addresses. A multiple interface configuration has the disk drives of the array on separate buses or loops. A single interface configuration has the disk drives on the same bus or loop. A disk drive of any array can communicate directly with another disk drive in the single interface configuration, but must communicate with the other disk drive through the array controller in a multiple interface configuration.

For both of these architectures, the disk controller of each disk drive should have the capability to store new data, perform a logic function (such as an exclusive-OR (XOR) function) on that new data with old data from the logical address of the new data, and output the result of that XOR function for use by a parity drive. The disk controller should also have the capability to receive from another drive in the array parity bits from an XOR function of the old and new data, XOR that result with the old parity bits corresponding to the old data stored on the other drive, and store the resulting new parity bits to the address of the old parity bits. Further detail is available in "RAID 5 Support on SCSI Disk Drives", Rev. 1.5, Seagate Technology, which is hereby incorporated by reference.

An example of these capabilities is shown in FIG. 1, which illustrates a multiple interface striping configuration with a distributed XOR function. An array controller 10 receives new data from a host (not shown) via a lead 12 and stores the new data in a new data buffer 14. New data from new data buffer 14 is supplied to a port 16 via a lead 18. From port 16, the new data is supplied to distributed XOR device 20 and disk medium 22 of data disk drive 24 via lead 26. XOR device 20 performs an exclusive-OR function on the new data and the old data supplied from disk medium 22 via lead 21. The old data is retrieved from the old data address on disk medium 22. A CRC check of the data is also performed. The result from XOR device 20 is supplied via lead 27 to buffer 28. The host then reads the XOR result from buffer 28 to port 16 over a lead 30.

Port 16 provides the result to XOR buffer 32 via lead 34. The result is then output from port 36 via lead 38 to parity drive 40 via lead 42. Distributed XOR device 44 of parity drive 40 receives the result and performs an exclusive-OR function on the result and the old parity bits from disk medium 46. For a single interface striping configuration, the output from buffer 28 of data disk drive 24 would be supplied directly to XOR device 44 of parity drive 40. The old parity bits corresponds to the old data of data disk drive 24. The resulting new parity bits are written to the disk medium 46.

To support the distributed XOR function, distributed XOR device 20 of data disk drive 24 in FIG. 1 contains XOR buffering. A traditional arrangement would utilize two separate buffers. To illustrate, FIG. 2 shows a distributed XOR device 20 having data buffers 50 and 60, along with temporary buffer 70 and XOR logic 80.

Still referring to FIG. 2, old data is written to data buffer 50 in response to a write command from the host (not shown) and stored in temporary buffer 70. New data from the host is stored in a data buffer 60. XOR logic 80 receives the data from both buffers 60 and 70, and performs an exclusive-OR function on both data. The result of the exclusive-OR function is then stored in temporary buffer 70. Since temporary buffer 70 is usually not large enough to store the entire contents of the result, the result is then stored in buffer 28. Buffer 28 can then supply data to either array controller 10 or parity disk drive 40 (FIG. 1), depending on whether a multiple or single interface striping arrangement is used.

Disadvantages of the traditional arrangement described above are its costs. If data buffers 50 and 60 are large, then temporary buffer 70 must be correspondingly large, which is expensive. If temporary buffer 70 is not large enough to store the result of the exclusive-OR function, additional buffer bandwidth must be used to write the result to buffer 28. If temporary buffer 70 is too small, then the old and new data cannot not be read in long bursts from data buffers 50, 60. This exacts a time cost since data will take longer to be read from data buffers 50, 60. Buffer 28 also imparts a time delay.

In addition, a read from and a write to temporary buffer 70 occurs for every data buffer 60 read. Consequently, temporary buffer 70 must maintain twice the bandwidth required for reading data buffer 60. The bandwidth of temporary buffer 70 will either put a limit on the bandwidth of distributed XOR device 20, or will be expensive to implement in hardware.

SUMMARY OF THE INVENTION

The present invention provides a distributed logic function device, preferably including an XOR function, that includes a storage device, such as a data buffer. The data buffer stores at least two data blocks in a preferred interleaved manner. The data blocks contain data words, and a specific data word for each data block contains CRC bits. In response to certain addresses, the data words of the data blocks are output from the data buffer in an interleaved manner.

A logic function engine circuit, such as an XOR engine circuit, receives the interleaved data words. The XOR engine circuit preferably includes a data logic function circuit, like a data XOR circuit, and an error detection circuit. The data XOR circuit combines pairs of data words, preferably by performing an exclusive-OR function, where one data word is from one data block and the other data word in from the other data block. The generated results are output to the error detection circuit.

The error detection circuit generates CRC bits from the results. Preferably, the CRC bits are encoded with a constant $ID_{CRC}$. These encoded CRC bits are compared to the result of the exclusive-OR function on the CRC bits of the data blocks. If these bits are not equal, an error signal is output. The comparison therefore checks whether the XOR engine circuit or the data blocks are in error.

The present invention also provides a method of data error detection. This method preferably includes the steps of receiving at least two combined data blocks and performing a CRC check on the combined data blocks. If the CRC check determines that there is an error, an error signal is output.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE DRAWINGS

FIG. 3 is a block diagram of a distributed XOR device according to the present invention.

DETAILED DESCRIPTION OF THE PREFERRED EMBODIMENT

Figure 1:
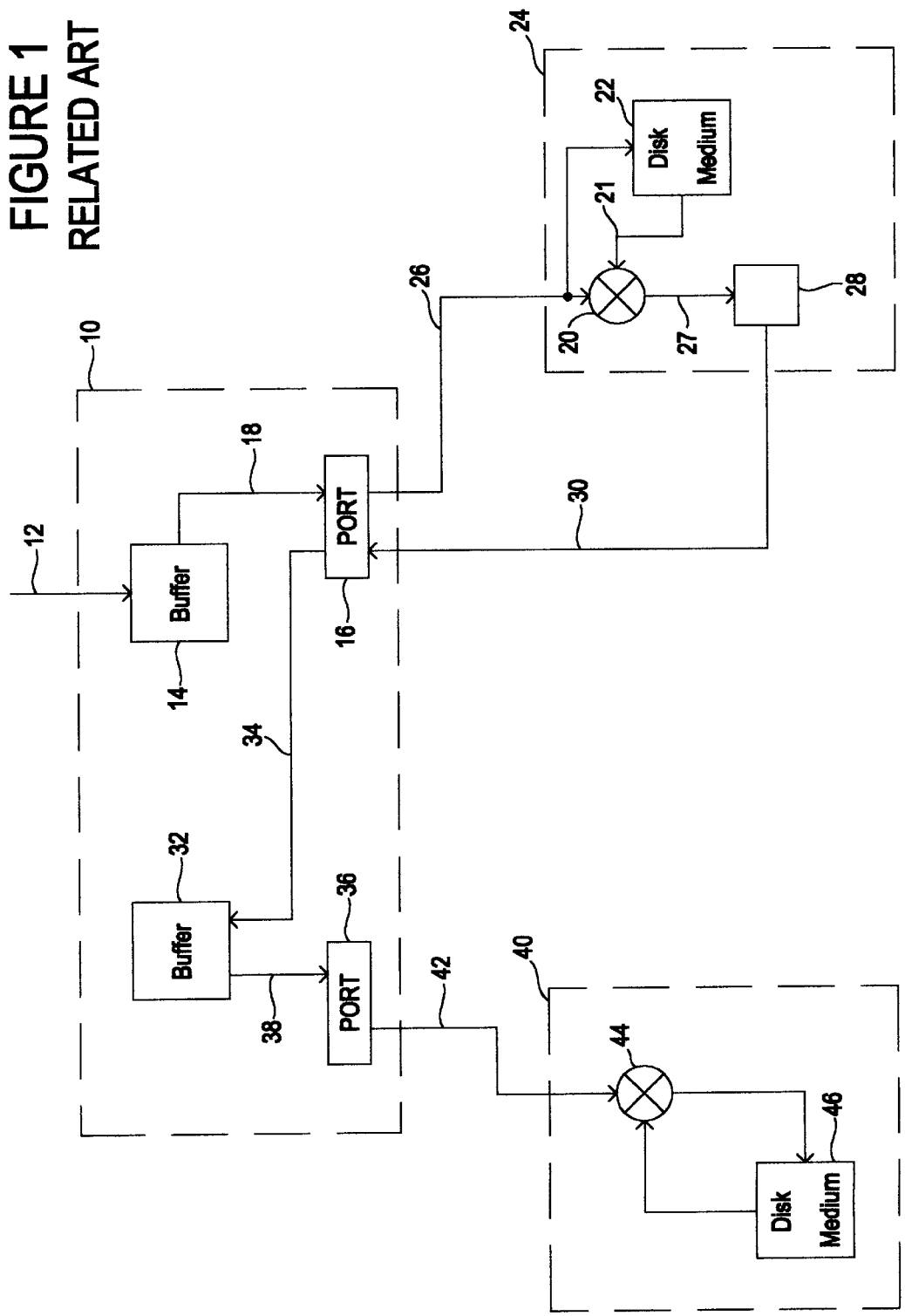
FIG. 1 is a block diagram of a RAID multiple interface striping architecture having a distributed Read-Modify-Write operation according to a related art.
Figure 2:
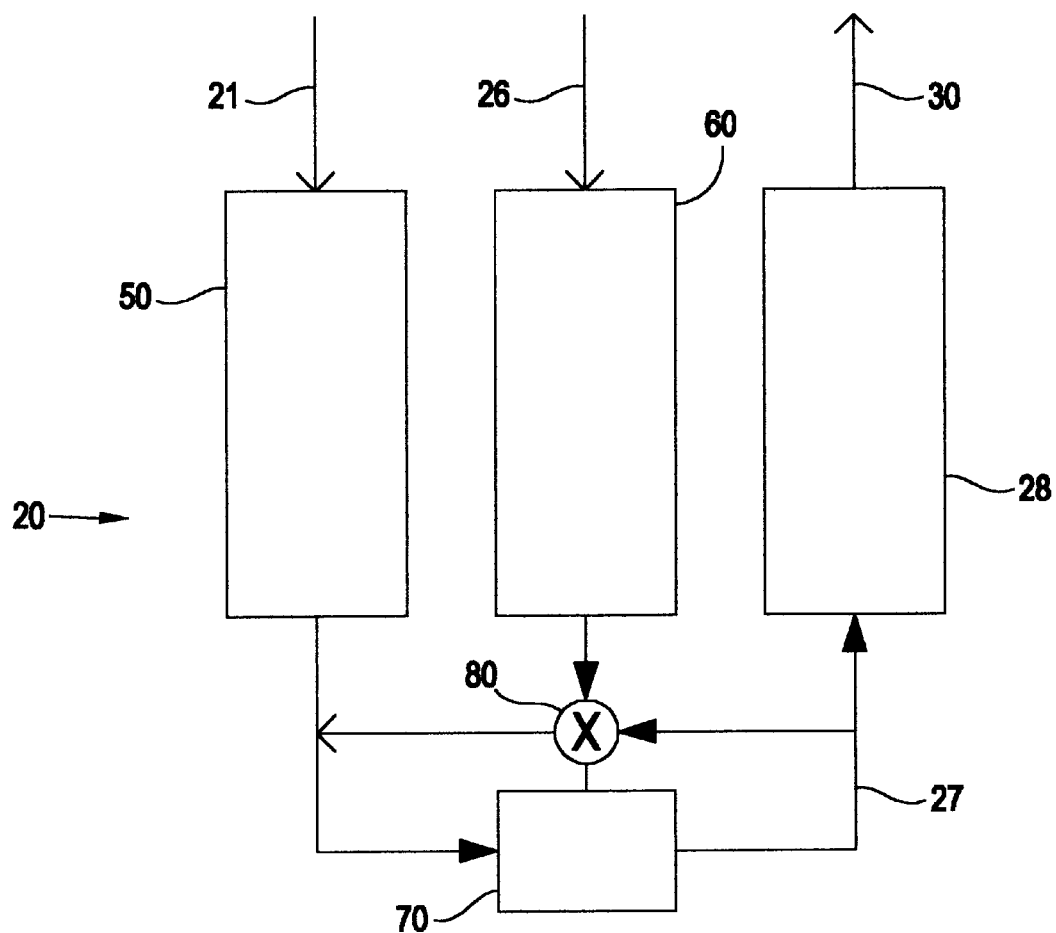
FIG. 2 is a block diagram of the distributed XOR device and buffer according to the related art of FIG. 1.

While this invention is susceptible of embodiment in many different forms, there is shown in the drawings and will be described herein in detail a specific embodiment thereof with the understanding that the present disclosure is to be considered as an exemplification of the principles of the invention and is not to be limited to the specific embodiment described.

FIG. 3 illustrates a distributed XOR device 120 according to the present invention. Distributed XOR device 120 includes a data buffer 140 coupled to receive addresses over an address lead 145. Data buffer 140 is also coupled to receive data from a MUX 150 over a lead 155. MUX 150 receives data from data leads 160, 165. Data buffer 140 is coupled to an XOR engine circuit 170 via a lead 180.

XOR engine circuit 170 includes a data XOR circuit 200, an error detection circuit 220 and a MUX 260. Data XOR circuit 200 includes XOR logic 205 that is coupled to data buffer 140 via lead 180. An XOR MUX 210 is coupled to XOR logic 205 via a lead 208 and is coupled to data buffer 140 via lead 180. An XOR register 215 is coupled to XOR MUX 210 via a lead 212 and is coupled to XOR logic 205 via a lead 216.

Data XOR circuit 200 is coupled to error detection circuit 220 and MUX 260 via a lead 218. Error detection circuit 220 includes a CRC generator 225 coupled to data XOR circuit 200 via lead 218. An error detection XOR logic 230 is coupled to CRC generator 225 via a lead 226. An ID counter 235 is coupled to error detection XOR logic 230 via a lead 232. Error detection XOR logic 230 is coupled to a comparator 250 and MUX 260 via a lead 235. Comparator 250 is coupled to data XOR circuit 200 via lead 218. Comparator 250 and MUX 260 provide output signals on respective leads 255 and 265.

The operation of distributed XOR device 120 will be explained with reference to FIG. 3. An array controller sends a write command to a buffer manager (not shown) of the disk controller that includes distributed XOR device 120. New (written) and old (stored) data blocks are provided to data buffer 140 by MUX 150 on data leads 160 and 165. It is preferred that one of data leads 160, 165 is coupled to a disk medium (not shown) and the other lead is coupled to the array controller.

Addresses are provided over address lead 145 to data buffer 140 to load the multiplexed data blocks. It is preferred that lead 145 is coupled to the buffer manager. The buffer manager preferably provides addresses that are selectively incremented by one or two. Providing the two-increment addresses allows data to be read from or written to all even or all odd addresses.

Distributed XOR device 120 loads or stores a data block in data buffer memory 140 in response to a command from the host. Specifically, MUX 150 is controlled to provide over lead 155 to data buffer 140 an old data block received over one of data leads 160, 165. Coincidentally, addresses incremented by two are provided via lead 145 to store the old data block in alternating address locations, for example odd address locations. This data storage in data buffer 140 is represented by data words A1, A2, . . . , A_CRC in FIG. 3.

Distributed XOR device 120 then loads a new data block in data buffer 140. MUX 150 is switched to provide over lead 155 to data buffer 140 the new data block received over the other one of data leads 160, 165. Addresses incremented by two are concurrently provided via lead 145 to store the new data block in alternating, even address locations. This data storage in data buffer 140 is represented by data words B1, B2, . . . , B_CRC in FIG. 3. The new and old data blocks are stored in data buffer 140 in a preferred interleaved manner as illustrated.

Each stored data block is a code word that was generated by a conventional CRC technique. For example, old data block A1, A2, . . . , A_CRC is a code word where all the data words A1, A2, . . . except A_CRC are the actual data. Data word A_CRC includes CRC bits that were generated by the conventional CRC technique. Data word A_CRC is encoded with a logical sector address (LSA) of the disk medium. The LSA represents the starting address of the disk medium that stores the old data block. The LSA is included in data word A_CRC to confirm that the read data block is the correct data block that was addressed. New data block B1, B2, . . . , B_CRC is a similar code word with an encoded LSA that is the same as the LSA encoded for the old data block.

Once data buffer 140 is loaded, the buffer manager provides addresses successively incremented by one to data buffer 140. This causes data blocks to be read out in an interleaved series, e.g., A1, B1, A2, B2, . . . , A_CRC, B_CRC, and are provided to XOR engine circuit 170. Briefly, XOR engine circuit 170 will perform a preferred exclusive-OR function to combine corresponding data words (e.g. A1, B1) from the data blocks. XOR engine circuit 170 will detect any error in the combined data words. Combining data includes arithmetic and Boolean functions.

In particular, an address associated to data word A1 is provided to data buffer 140. Data word A1 is then provided over lead 180 to MUX 210 which is selected to output data word A1 to register 215. At about the same time, an address associated to data word B1 is provided to data buffer 140. Data word B1 is then provided to XOR logic 205 and is exclusive-ORed (combined) with data word A1 from XOR register 215 via lead 216. The result is latched in XOR register 215 via MUX 210.

The exclusive-OR result (combined data) of data words A1 and B1, temporarily stored in XOR register 215, is then provided to both error detection circuit 220 and MUX 260 via lead 218. MUX 260 is selected to pass this result over lead 265 to another buffer, such as buffer 28 shown in FIG. 1. Or, lead 265 can be multiplexed onto one of leads 160, 165 in response to a write command.

Subsequent sequential even/odd addresses are provided to data buffer 140 to read out all the data words. The operation discussed above is performed for each pair of corresponding data words of the new and old data blocks. The exclusive-OR result (combined data) for each pair of data words is output from XOR register 215 to CRC generator 225 of error detection circuit 220. CRC generator 225 uses all these results or combined data to generate CRC bits for the exclusive-OR (combined) results of the data word pairs. Error detection XOR logic 230 performs a preferred exclusive-OR function on the CRC bits from CRC generator 225 and a constant $ID_{CRC}$ (explained below) output from ID counter 235.

MUX 260 is selected to provide the exclusive-OR result of the CRC bits and the constant $ID_{CRC}$ from error detection XOR logic 230. Comparator 250 compares the exclusive-OR result of data words A_CRC and B_CRC from XOR register 215 to the exclusive-OR result of the CRC bits and the constant $ID_{CRC}$. If the results are not equal, an error signal is transmitted over lead 255 to preferably either the array controller or a parity (CRC) disk drive.

As discussed above, the data words A_CRC and B_CRC are preferably encoded with an LSA. This "end loading" encoding is performed with an exclusive-OR function by preference. When the data words A_CRC and B_CRC are exclusive-ORed together by XOR logic 205, the LSA encoding is removed.

However, the result of the exclusive-OR of the data words A_CRC and B_CRC does not represent the correct CRC bits for the exclusive-OR of the previous data words A1, A2, . . . and B1, B2, . . . . Therefore, the result of the exclusive-OR of the data words A_CRC and B_CRC is preferably encoded with the constant $ID_{CRC}$. The constant $ID_{CRC}$ represents the CRC bits generated by the conventional CRC technique of an all zero data block.

When a data read command is requested by the host, MUX 150 is controlled to provide over lead 155 to data buffer 140 an old data block received from the disk medium over one of data leads 160, 165. Addresses are provided over address lead 145 to data buffer 140 to load the old data blocks. The old data blocks are output to XOR engine circuit 170. MUX 210 is selected so that the old data blocks bypass XOR logic 205 via lead 180. The old data blocks are passed through register 215 to MUX 260. MUX 260 is selected to output the old data blocks from lead 218 to lead 265.

While the old data block is output on lead 265, the old data block is also provided to error detection circuit 220. CRC generator 225 generates CRC bits for the data words of the old data blocks. These CRC bits are encoded with the corresponding LSA stored in ID counter 235. ID counter 235 is incremented for the next data block.

When the CRC bits of the old data block are available on lead 218, MUX 260 is selected to output the generated CRC bits that are encoded with the corresponding LSA. Concurrently, comparator 250 compares the CRC bits of the old data block to the output of the generated CRC bits that are encoded with the corresponding LSA. If the two CRC bits are not equal, an error signal is provided on lead 255.

The preferred embodiment of the present invention provides numerous advantages. First, the use of data buffer 140 that outputs data in an interleaved manner allows the XOR engine circuit 170 to perform the data word combination and the error detection on-the-fly while still maintaining burst access to data buffer 140. This approach halves the necessary available bandwidth of the storage device, e.g. data buffer 140. If two storage devices are used instead of the single storage device, the maximum burst length is reduced.

Second, end loading has the advantage that constant $ID_{CRC}$ (representing an all zero data block) is calculated once for all the data blocks with different LSAs. If the LSA were part of the seed data of the CRC generator, the $ID_{CRC}$ would have to be recalculated for each data block. This recalculation would require another CRC generator. The presently preferred XOR engine circuit, therefore, has less hardware, particularly another CRC generator used to recalculate the constant $ID_{CRC}$ for each data block. In addition, the circuitry of XOR engine circuit 170 not only checks data integrity as it is read and written, but also checks the XOR engine circuit 170 hardware integrity.

Numerous variations and modifications of the embodiment described above may be effected without departing from the spirit and scope of the novel features of the invention. For example, the preferred embodiment illustrated in FIG. 3 includes the illustrated leads that are preferably buses. These buses allow the distributed XOR device 120 to process data in parallel. However, serial leads can be used without parting from the scope of the present invention.

Another example is that the preferred embodiment of the present invention as illustrated in FIG. 3 shows error detection circuit 220 coupled to data XOR circuit 200 as a direct connection, which is not required for the present invention. Although not preferred, error detection circuit 220 may be coupled to data XOR circuit 200 through another device or circuit, such as a buffer. The other device or circuit would cause a time delay, and thus prevent data combination and error detection on-the-fly.

It is to be understood that no limitations with respect to the specific device illustrated herein are intended or should be inferred. It is, of course, intended to cover by the appended claims all such modifications as fall within the scope of the claims.

I claim:

1. A device configured to perform error detection, said device comprising:

a data buffer containing an interleaved series of new and old data;

a data circuit configured to serially receive the interleaved series of new and old data from the data buffer, and combine the new and old data; and an error detection circuit configured to receive the combined data from the data circuit and perform error detection thereon.

2. The device of claim 1 wherein the error detection circuit generates CRC bits in response to the interleaved series of new and old data received, encodes the CRC bits with a constant, and compares at least a portion of the interleaved series to the encoded CRC bits.

3. The circuit of claim 2 wherein the error detection device generates an error signal if the portion of the interleaved series and the encoded CRC bits are not equal.

4. An error detection method comprising the steps of:

configuring old and new data into an interleaved series;

serially transmitting said interleaved series along a lead to a data circuit which is configured combine the new and old data; and using an error detection circuit to perform error detection on the combined data.

5. The method of claim 4 wherein the interleaved series of old and new data includes at least one data block comprising old data and at least one data block comprising new data.

6. The method of claim 5 wherein the data blocks include data words and the step of combining data includes combining pairs of the data words.

7. The method of claim 4 further comprising the step of performing error detection on a data block.

8. The method of claim 4 further comprising the step of receiving data through a direct connection.

9. A method of data error detection comprising the steps of:

serially receiving data blocks along a single lead, said data blocks comprising an interleaved series of old and new data;

combining the data blocks; and performing a CRC check on the combined data blocks.

10. The method of claim 9 further comprising the step of providing an error signal in response to an outcome of the CRC check.

11. The method of claim 9 wherein the data blocks include data words and the step of performing a CRC check includes combining pairs of the data words.

12. The method of claim 11 wherein the step of performing a CRC check further includes generating CRC bits from a plurality of the combined pairs of the data words.

13. The method of claim 12 wherein the step of performing a CRC check further includes encoding the generated CRC bits.

14. The method of claim 13 wherein the step of performing a CRC check further includes comparing the encoded generated CRC bits with a one of the combined pairs of the data words.

15. The method of claim 13 wherein the step of encoding the generated CRC bits includes combining a constant with the generated CRC bits wherein the constant is generated by an all zero data block and a generator polynomial.

16. The method of claim 9 further comprising the step of receiving a data block and performing a CRC check on the data block.

17. The method of claim 9 wherein the receiving step includes receiving the data blocks through a direct connection.

18. The method of claim 9 wherein the data blocks are end loaded.

* * * * *